US011999609B2

(12) United States Patent
Brown et al.

(10) Patent No.: US 11,999,609 B2
(45) Date of Patent: Jun. 4, 2024

(54) PULSER SHIELD

(71) Applicant: D&H United Fueling Solutions, Inc., San Antonio, TX (US)

(72) Inventors: Doug Brown, Colorado Springs, CO (US); Justin Young, Victor, CO (US); Bolling Sasnett, III, Houston, TX (US); William Reichhold, Austin, TX (US)

(73) Assignee: D&H United Fueling Solutions, Inc., San Antonio, TX (US)

( * ) Notice: Subject to any disclaimer, the term of this patent is extended or adjusted under 35 U.S.C. 154(b) by 59 days.

(21) Appl. No.: 17/976,978

(22) Filed: Oct. 31, 2022

(65) Prior Publication Data

US 2024/0140780 A1 May 2, 2024

(51) Int. Cl.
*B67D 7/34* (2010.01)

(52) U.S. Cl.
CPC .................................... *B67D 7/34* (2013.01)

(58) Field of Classification Search
CPC ........................................................ B67D 7/34
See application file for complete search history.

(56) References Cited

U.S. PATENT DOCUMENTS 4,369,437 A * 1/1983 Thompson, Jr. ....... G08B 13/08 340/539.1
6,908,014 B1 * 6/2005 Glover ..................... B67D 7/34 222/153.1
11,734,971 B1 * 8/2023 Jenkins .............. G07C 9/00182 700/282
11,738,991 B1 * 8/2023 Smith ...................... B67D 7/84 222/153.01
2009/0314804 A1 12/2009 Kinzie et al.
2010/0071422 A1 * 3/2010 Kiest ........................ B67D 7/84 70/14
2010/0090855 A1 * 4/2010 Wolf ........................ B67D 7/22 340/686.6
2015/0148942 A1 * 5/2015 DeWitt .................... B67D 7/32 700/231
2018/0229997 A1 * 8/2018 Long ........................ B67D 7/36
2021/0362998 A1 * 11/2021 Stumpf .................... B67D 7/42
2022/0036673 A1 2/2022 Fieglein et al.

OTHER PUBLICATIONS

Feb. 13, 2024 International Search Report and Written Opinion issued in PCT/US2023/036253.

* cited by examiner

*Primary Examiner* — Kevin R Barss
(74) *Attorney, Agent, or Firm* — Akerman LLP

(57) ABSTRACT

A pulser protection device configured to be coupled to a fuel pump sandwiched between the pulser lines of the fuel. The pulser protection device comprises one uniform body with four substantially rectangular segments. The four substantially rectangular segments includes a first, a second, a third, and a fourth substantially rectangular segment. The second, third, and fourth substantially rectangular segments being bent orthogonally from the first substantially rectangular segment. The pulser device sized to be received between a plurality of pulsers of the fuel pump and if present a mailbox printer of the fuel pump. The method of attachment for pulser within the fuel pump is described herein.

20 Claims, 2 Drawing Sheets

PULSER SHIELD

TECHNICAL FIELD

This application relates generally to fuel pump protection and more particularly to pulser protection.

BACKGROUND

The manipulation and tampering of fuel pump pulsers is a novel issue that has yet to be addressed in the industry. Current methods of manipulating pump pulsers includes the use of homemade devices that manipulate the pulser mechanism fooling the fuel pump into pumping more gas while not properly accounting for the amount of money to be charged. Essentially, the manipulation of the pulsers allows for a person to steal large amounts of fuel for significantly less cost. The issue has significant losses in the fuel pump industry as this issue has not been formally addressed, especially during times with high gas prices the tampering of the pulsers create significant losses and problems for fuel retailers.

Current solutions for the theft of fuel does not address the underlying issue of pulser manipulation. Current solutions consist primarily of increased camera surveillance, adding additional locks on the fuel pump, and utilizing tampering alarms to name a few.

SUMMARY OF THE INVENTION

The disclosure addresses the novel issue of pulser tampering by providing a pulser shield device to significantly limit the access of the fuel pump pulsers. The pulser shield is one uniform solid material that can be fixedly attached within the fuel pump covering all of the pulser within the fuel pump. The pulser shield device is configured to fit snugly between the pulsers and if there is a mailbox printer present, then the pulser shield device is further configured to fit snugly with the mailbox printer of the fuel pump. The pulser shield is able to secure any number of pulsers found within a fuel pump and is able to be installed without breaking the vapor barrier of the fuel pump. Protecting the pulsers from tampering while also not breaking the vapor barrier, which would present a safety issue, presents a novel solution to a novel problem.

The pulser protection device is a uniform body being made from a single material. The uniform body has rectangular segments. Where each segment is located the edge is a pivot point where the segments are to be bent towards a 90° angle. The uniform body has a proximal end, a distal end, a superior end, and an inferior end. The first rectangular segment of the four rectangular segments has the second rectangular segment inferior and continuous to the first rectangular segment. The first rectangular segment has the third rectangular segment proximal to and continuous with the first rectangular segment. The first rectangular segment has the fourth substantially rectangular segment distal to and continuous with the first rectangular segment. The third rectangular segment is opposite the fourth rectangular segment. The third and the fourth rectangular segments each have at least one hole that is sized to receive a fastener.

In another embodiment, the second rectangular segment is bent orthogonally below the axis of the first rectangular segment.

In another embodiment, the third and the fourth rectangular segments are bent orthogonally above the axis of the first rectangular segment.

In another embodiment, the third and the fourth rectangular segments are parallel.

In another embodiment, the third and the fourth rectangular segments are orthogonal the second substantially rectangular segment.

In another embodiment, the at least one hole includes two square punched holes on each of the third and the fourth rectangular segments and is sized to receive the fastening element, the two square punched holes on each of the third and the fourth rectangular segments are sized to receive a 0.25 inch −20×0.75 inch fastener.

In another embodiment, the first rectangular segment is larger than the second, third, and fourth rectangular segments.

In another embodiment, the third and the fourth rectangular segments are the same size.

In another embodiment, the first rectangular segment is 36.5 inches long and 3.5 inches wide, the second rectangular segment is 34 inches long and 0.75 inches wide, and the third and the fourth rectangular segment are both 1.25 inches long and 3.5 inches wide.

In another embodiment, the first rectangular segment is 36.5 inches long and 4 inches wide, the second rectangular segment is 32 inches long and 1.75 inches wide, and the third and the fourth rectangular segment are both 1.25 inches long and 4 inches wide.

In another embodiment, the first rectangular segment includes a right angle cut out at the midpoint of the first rectangular segment. The right angle cut out is 4.25 inches wide along the superior side of the first rectangular segment and opposite the second rectangular segment, and 2.125 inches deep into the first rectangular segment.

In another embodiment, the uniform body is a metal.

The method of attaching a pulser protection device includes the following steps: opening an at least one fuel pump dispenser door; removing the two side skins from the fuel pump; determining if the mailbox printer needs unmounting from the interior of the fuel pump; inserting the pulser protection device; marking holes in the position of where the four square holes are located along the side walls of the fuel pump; drilling at least four holes in the sides of the fuel pump from where the four holes were marked on the side of the fuel pump; lining the holes from the third and the fourth rectangular segments of the pulser protection device with the at least four holes in the sides of the fuel pump; fastening a fastener through each of the holes of the third and the fourth rectangular segments of the pulser protection device with the at least four hole in the sides of the fuel pump; remounting the mailbox printer if required from the interior of the fuel pump; reattaching the two side skins to each side of the fuel pump; and closing the fuel pump dispenser doors.

BRIEF DESCRIPTION OF THE DRAWINGS

Other features and advantages of the disclosure will become apparent in the following detailed description of the embodiment(s) with reference to the accompanying drawings, in which.

DETAILED DESCRIPTION

Figure 1:
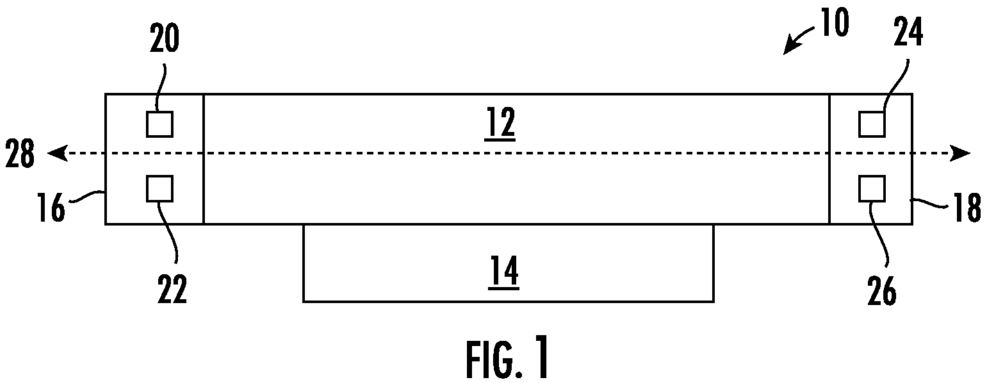
FIG. 1 is a top view of the pulser shield prior to bending.
Figure 2:
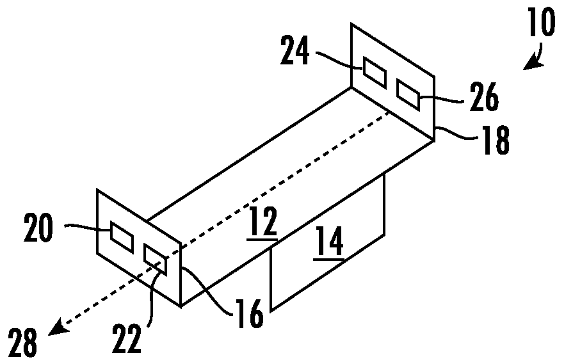
FIG. 2 is a perspective view of the pulser shield of FIG. 1 after bending.
Figure 3:
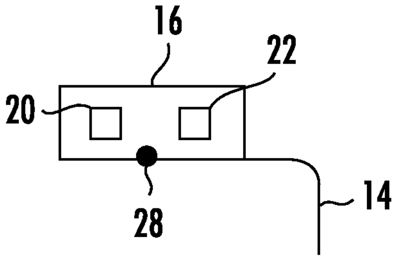
FIG. 3 is side view of FIG. 2.

Before the disclosure is described in greater detail, it should be noted that where considered appropriate, reference numerals have been repeated among the figures to indicate corresponding or analogous elements, which may optionally have similar characteristics.

To aid in describing the disclosure, directional terms may be used in the specification and claims to describe portions of the present disclosure (e.g., front, rear, left, right, top, bottom, proximal, distal, superior, inferior, etc.). These directional definitions are intended to merely assist in describing and claiming the disclosure and are not intended to limit the disclosure in any way.

Embodiments of the present disclosure are best understood by referring to FIGS. 1-4 of the drawings, like numerals being used for like and corresponding parts of the various drawings.

In one embodiment disclosed, the pulser shield 10 has four substantially rectangular segments. The pulser shield 10 is a unibody material that pivots at the edge of each of the four rectangular segments. The first rectangular segment 12 defines an axis 28 that extends longitudinally along the first rectangular segment 12. The second rectangular segment 14 is smaller than the first rectangular segment 12 and bends parallel to and orthogonally below the axis 28. The third rectangular segment 16 and the fourth rectangular segment 18 bends orthogonally to and above the axis 28.

The third rectangular segment 16 has at least one hole that is sized to receive a fastener. The holes in the third rectangular segment 16 can be two square punched holes 20, 22 that are each sized to receive at least one fastener. The fourth rectangular segment 18, can be identical with the third rectangular segment 16. The fourth rectangular segment 18 can also have the at least one hole being two square holes 24, 26 that are sized to receive at least one fastener.

In one embodiment, the first rectangular segment 12 is 36.5 inches long and 3.5 inches wide, the second rectangular segment 14 is 34 inches long and 0.75 inches wide, and the third rectangular segment 16 and the fourth rectangular segment 18 are both 1.25 inches long and 3.5 inches wide.

In one embodiment, the first rectangular segment 12 is 36.5 inches long and 4 inches wide, the second rectangular segment 14 is 32 inches long and 1.75 inches wide, and the third rectangular segment 16 and the fourth rectangular segment 18 are both 1.25 inches long and 4 inches wide.

In one embodiment, the first rectangular segment 12 has a right angle cut out along the superior side of the first rectangular segment 12 opposite the second rectangular segment 14. The right angle cut out being 4.25 inches wide and 2.125 inches deep into the first rectangular segment 12.

In one embodiment, the square holes 20, 22, 24, 26 are sized to receive a 0.25 inch −20×0.75 inch fastener.

In one embodiment, the unibody pulser shield 10 can be made from a metal, durable plastic, tempered glass, or a composite. The unibody pulser shield 10 can be preferably made from a metal.

Figure 4:
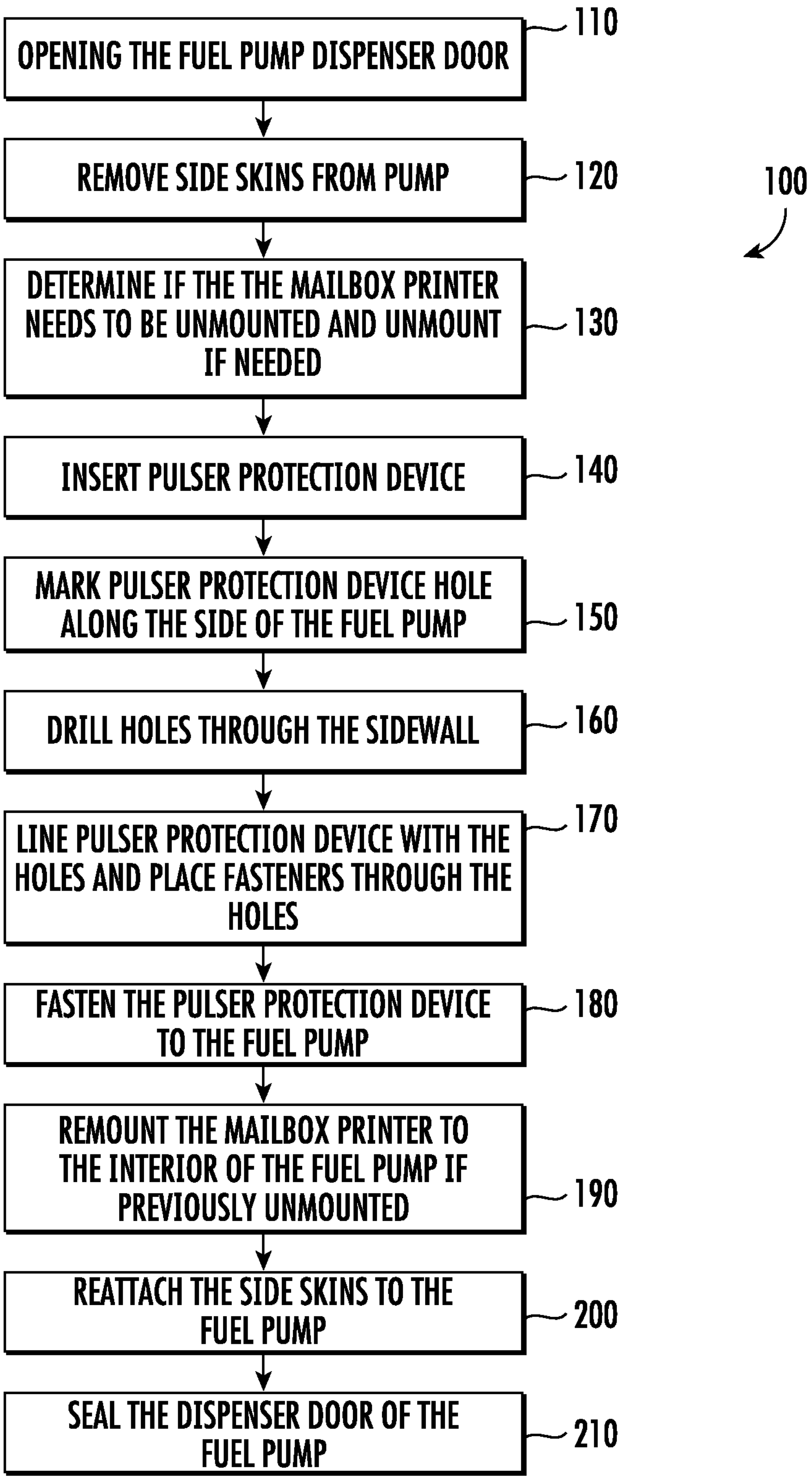
FIG. 4 is a flow diagram of the pulser shield attachment method.

In another embodiment describing FIG. 4 is a method 100 of attaching a pulser protection device 10 into a fuel pump. The process begins with opening all of the fuel pump dispenser doors 110. After opening the fuel pump dispenser doors 110, the two side skins of the fuel pump need to be removed 120. After removing the side skins 120 determine if the mailbox printer found within the fuel pump needs to unmounted from the interior 130. After the work space has been cleared, the pulser protection device 10 that has already been bent into position similar to FIG. 2 and FIG. 3, can be inserted into the fuel pump 140 over at least one pulser, but preferably over all of the pulsers of the fuel pump. Once the pulser protection device 10 is placed over the at least one pulser, the holes 20, 22, 24, 26 are marked into position 150. After marking the hole position along the side walls of the fuel pump 150, the marked positions are then drilled through the side walls of the fuel pump 160 to allow for a fastener to pass through the holes of the side wall and the holes 20, 22, 24, 26 of the pulser protection device 10. After the holes are drilled 160, the pulser protection device 10, is placed into position lining up all of the holes 170, the fasteners are placed through the holes and fastens together the pulser protection device 10 and the side walls of the fuel pump 180. After the pulser protection device is fastened to the fuel pump 180, if the mailbox printer is present, then it is remounted above the pulser protection device if required 190, the side skins of the fuel pump are reattached 200, and the fuel pump dispenser doors are sealed 210.

This disclosure describes various elements, features, aspects, and advantages of various embodiments and examples and configurations thereof of composite compositions. It is to be understood that certain descriptions of the various embodiments have been simplified to illustrate only those elements, features and aspects that are relevant to a more clear understanding of the disclosed embodiments, while eliminating, for purposes of brevity or clarity, other elements, features and aspects. Any references to "various embodiments," "certain embodiments," "some embodiments," "one example," "one embodiment," "an example," or "an embodiment" generally means that a particular element, feature and/or aspect described in the embodiment is included in at least one embodiment. The phrases "in various embodiments," "in certain embodiments," "in some embodiments," "in one embodiment," or "in an embodiment" may not refer to the same embodiment." Furthermore, the phrases "in one such embodiment" or "in certain such embodiments," or "in one example," while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. It is to be appreciated that persons having ordinary skill in the art, upon considering the descriptions herein, will recognize that various combinations or sub-combinations of the various embodiments and other elements, features, and aspects may be desirable in particular implementations or applications. However, because such other elements, features, and aspects may be readily ascertained by persons having ordinary skill in the art upon considering the description herein, and are not necessary for a complete understanding of the disclosed embodiments, a description of such elements, features, and aspects may not be provided. As such, it is to be understood that the description set forth herein is merely exemplary and illustrative of the disclosed embodiments and is not intended to limit the scope of the invention as defined solely by the claims.

The invention claimed is:

1. A pulser protection device comprising:

a uniform body, the uniform body being made from a single material;

the uniform body including four substantially rectangular segments;

the uniform body having a proximal end, a distal end, a superior end, and an inferior end;

a first substantially rectangular segment of the four substantially rectangular segments having a second substantially rectangular segment inferior and continuous to the first substantially rectangular segment;

the first substantially rectangular segment having a third substantially rectangular segment proximal to and continuous with the first substantially rectangular segment;

the first substantially rectangular segment having a fourth substantially rectangular segment distal to and continuous with the first substantially rectangular segment;

the third substantially rectangular segment being opposite the fourth substantially rectangular segment; and the third and the fourth substantially rectangular segments having at least one hole sized to receive a fastening element.

2. The pulser protection device of claim 1 wherein, the second substantially rectangular segment is bent orthogonally below an axis of the first substantially rectangular segment.

3. The pulser protection device of claim 2 wherein, the third and the fourth substantially rectangular segments is bent orthogonally above the axis of the first substantially rectangular segment.

4. The pulser protection device of claim 3 wherein, the third and the fourth substantially rectangular segments are parallel.

5. The pulser protection device of claim 3 wherein, the third and the fourth substantially rectangular segments are orthogonal the second substantially rectangular segment.

6. The pulser protection device of claim 1 wherein, the at least one hole includes two square punched holes on each of the third and the fourth substantially rectangular segments and is sized to receive the fastening element.

7. The pulser protection device of claim 6 wherein, the two square punched holes on each of the third and the fourth substantially rectangular segments are sized to receive a 0.25 inch −20×0.75 inch fastener.

8. The pulser protection device of claim 1 wherein, the first substantially rectangular segment is larger than the second, third, and fourth substantially rectangular segments.

9. The pulser protection device of claim 1 wherein, the third and the fourth substantially rectangular segments are the same size.

10. The pulser protection device of claim 1 wherein, the first substantially rectangular segment is 36.5 inches long and 3.5 inches wide, the second substantially rectangular segment is 34 inches long and 0.75 inches wide, and the third and the fourth substantially rectangular segment are 1.25 inches long and 3.5 inches wide.

11. The pulser protection device of claim 1 wherein, the first substantially rectangular segment is 36.5 inches long and 4 inches wide, the second substantially rectangular segment is 32 inches long and 1.75 inches wide, and the third and the fourth substantially rectangular segment are 1.25 inches long and 4 inches wide.

12. The pulser protection device of claim 11 wherein, the first substantially rectangular segment has a midpoint along the longitudinal axis, a superior side of the first substantially rectangular segment having a right angle cut-out at the midpoint of the first substantially rectangular segment, the right angle cut out being 4.25 inches wide along the superior side of the first substantially rectangular segment and 2.125 inches deep towards the midpoint of the first substantially rectangular segment.

13. The pulser protection device of claim 1 wherein, the uniform body is a metal.

14. The pulser protection device of claim 1 wherein, the first substantially rectangular segment is 36.5 inches long and 4 inches wide, the second substantially rectangular segment is 34 inches long and 0.75 inches wide, and the third and the fourth substantially rectangular segment are 1.25 inches long and 3.5 inches wide.

15. The pulser protection device of claim 1 wherein, the first substantially rectangular segment is 36.5 inches long and 4 inches wide, the second substantially rectangular segment is 32 inches long and 1.75 inches wide, and the third and the fourth substantially rectangular segment are 1.25 inches long and 4 inches wide.

16. The pulser protection device of claim 15 wherein, the first substantially rectangular segment has a midpoint along the longitudinal axis, a superior side of the first substantially rectangular segment having a right angle cut-out at the midpoint of the first substantially rectangular segment, the right angle cut out being 4.25 inches long along the superior side of the first substantially rectangular segment and 2.125 inches deep towards the midpoint of the first substantially rectangular segment.

17. A pulser protection device comprising:

a uniform body, the uniform body being made from a single material;

the uniform body including four substantially rectangular segments;

the uniform body having a proximal end, a distal end, a superior end, and an inferior end;

a first substantially rectangular segment of the four substantially rectangular segments having a second substantially rectangular segment inferior and continuous to the first substantially rectangular segment;

the second substantially rectangular segment being bent below an axis of the first substantially rectangular segment, and being orthogonal with the first substantially rectangular segment;

the first substantially rectangular segment having a third substantially rectangular segment proximal to and continuous with the first substantially rectangular segment;

the third and the fourth substantially rectangular segments being bent above and orthogonal to the axis of the first substantially rectangular segment, the third and the fourth substantially rectangular segments being orthogonal with the first substantially rectangular segment and orthogonal with the bent second substantially rectangular segment;

the first substantially rectangular segment having a fourth substantially rectangular segment distal to and continuous with the first substantially rectangular segment;

the third substantially rectangular segment being opposite the fourth substantially rectangular segment; and the third and the fourth substantially rectangular segments each having two square holes sized to receive a fastening element.

18. The pulser protection device of claim 17 wherein, the third and the fourth substantially rectangular segment are parallel and are sized to receive a 0.25 inch −20×0.75 inch fastener.

19. The pulser protection device of claim 17 wherein, the uniform body is a metal.

20. A method of attaching a pulser protection device comprising:

opening an at least one fuel pump dispenser door;

removing the at least two side skins from the fuel pump;

determining if a mailbox printer needs to be unmounted from the interior of the fuel pump;

inserting the pulser protection device;

the pulser protection device including:

a uniform body, the uniform body being made from a single material;

the uniform body including four substantially rectangular segments;

the uniform body having a proximal end, a distal end, a superior end, and an inferior end;

a first substantially rectangular segment of the four substantially rectangular segments having a second substantially rectangular segment inferior and continuous to the first substantially rectangular segment;

the second substantially rectangular segment being bent below an axis of the first substantially rectangular segment, and being orthogonal with the first substantially rectangular segment;

the first substantially rectangular segment having a third substantially rectangular segment proximal to and continuous with the first substantially rectangular segment;

the third and the fourth substantially rectangular segments being bent above the axis of the first substantially rectangular segment, the third and the fourth substantially rectangular segments being orthogonal with the first substantially rectangular segment and orthogonal with he bent second substantially rectangular segment;

the first substantially rectangular segment having a fourth substantially rectangular segment distal to and continuous with the first substantially rectangular segment;

the third substantially rectangular segment being opposite the fourth substantially rectangular segment; and the third and the fourth substantially rectangular segments each having two square holes sized to receive a fastening element;

marking holes in the position of where the four square holes are located along the side walls of the fuel pump;

drilling at least four holes in the sides of the fuel pump from where the four holes were marked on the side the fuel pump;

lining the holes from the third and the fourth substantially rectangular segments of the pulser protection device with the at least four hole in the sides of the fuel pump;

fastening a fastening element through each of the holes of the third and the fourth substantially rectangular segments of the pulser protection device with the at least four holes in the sides of the fuel pump;

remounting the mailbox printer if the mailbox printer was previously unmounted from the interior of the fuel pump;

reattaching the side skins to each side of the fuel pump; and closing the at least one fuel pump dispenser door.

* * * * *